United States Patent [19]

Chidester

[11] Patent Number: 4,707,891
[45] Date of Patent: Nov. 24, 1987

[54] CABLE CLAMP

[76] Inventor: Douglas A. Chidester, R.D. 2, Box 730, Greene, N.Y. 13778

[21] Appl. No.: 931,807

[22] Filed: Nov. 18, 1986

[51] Int. Cl.[4] ............ F16G 11/00; B65H 75/28
[52] U.S. Cl. .................. 24/136 R; 24/523; 242/125.3; 403/368
[58] Field of Search ............ 24/136 R, 136 L, 136 B, 24/136 K, 136 A, 115 G, 523; 403/368; 242/125.3

[56] References Cited

U.S. PATENT DOCUMENTS

| | | | |
|---|---|---|---|
| 210,281 | 11/1878 | Weston | 24/136 R |
| 1,228,059 | 5/1917 | Schneider | 242/125.3 |
| 1,291,870 | 1/1919 | Heimann | 24/523 |
| 2,207,892 | 7/1940 | Mullaney | 24/523 |
| 2,433,324 | 12/1947 | Rogers | 24/136 R |
| 2,484,088 | 10/1949 | Hayes | 24/523 |
| 2,835,538 | 5/1958 | Kornely | 24/522 |
| 2,859,469 | 11/1958 | Stockdale | 403/368 |
| 3,262,670 | 7/1966 | Marlett | 24/523 |
| 4,412,662 | 11/1983 | Rutecki | 242/125.3 |

FOREIGN PATENT DOCUMENTS

| | | | |
|---|---|---|---|
| 564010 | 9/1958 | Canada | 24/523 |
| 193034 | 12/1937 | Switzerland | 24/523 |

Primary Examiner—Victor N. Sakran
Attorney, Agent, or Firm—Richard G. Stephens

[57] ABSTRACT

A cable clamp for temporarily gripping an end length of cable comprises a tubular member having a side slot extending the length of the tubular member to allow a cable to be inserted into and removed from inside the tubular member. Spring means urge a bar situated within the tubular member against cable extending through the tubular member, and a handle extending outside the tubular member allow the user to rapidly clamp and unclamp the cable.

11 Claims, 6 Drawing Figures

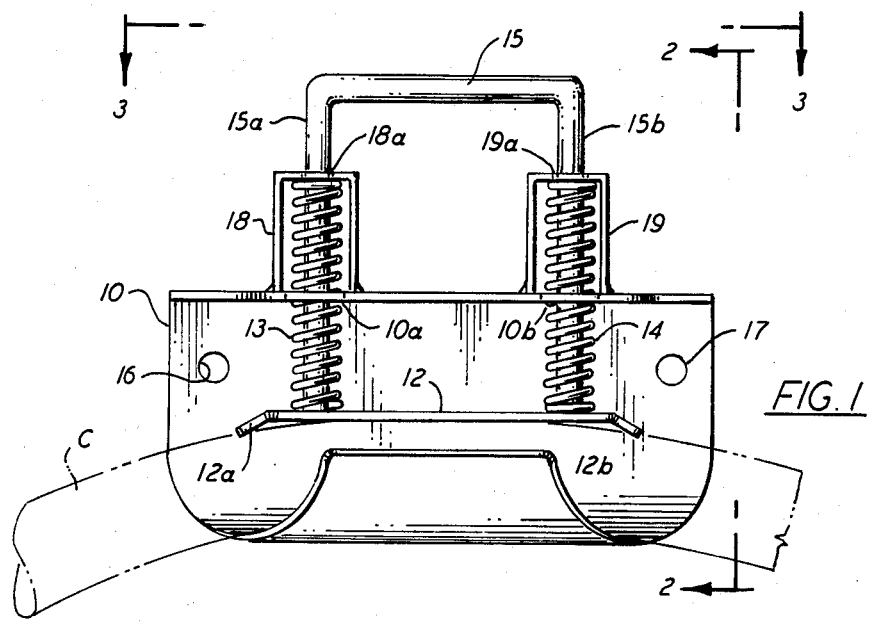
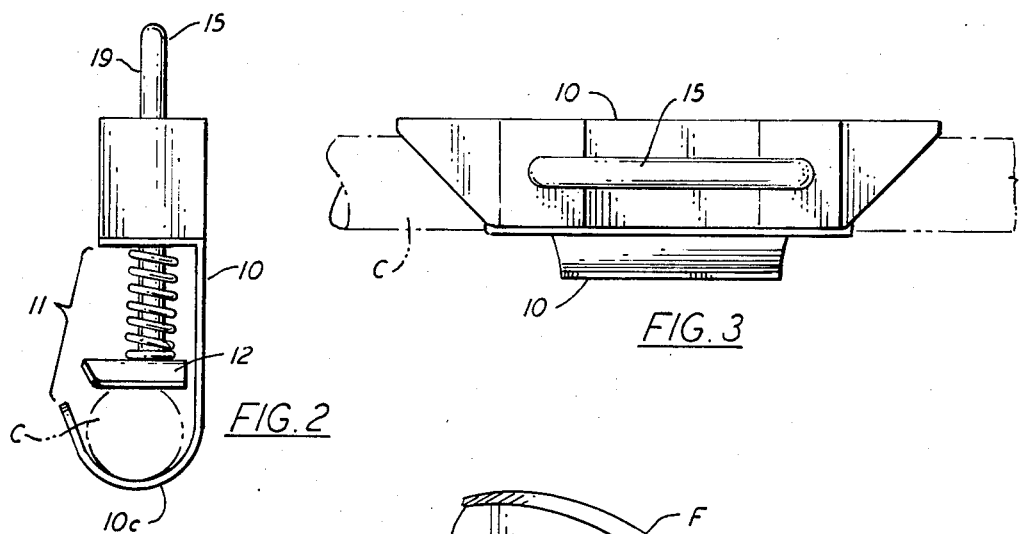
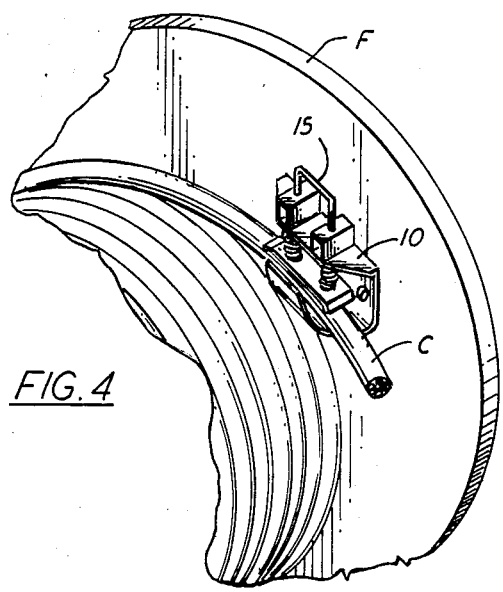

CABLE CLAMP

My invention relates to cable clamps, and more particularly, to simple, inexpensive and easily-operable self-locking clamps which may be used to temporarily hold the ends of cables wound on reels. Electrical cables used by utility companies and electrical contractors are usually supplied on cable reels, as are wire ropes used in hoists, elevators, and similar equipment, for highway guide rail installations. The term "cable" will be used herein to embrace both electrical and non-electrical cables, and wire ropes, whether stranded or solid, and whether they are insulated or not.

Cable is usually removed from a reel by extending a shaft means or arbor (often a length of pipe) through a central bore through the reel, and supporting the ends of the arbor sufficiently above the ground or floor, by means of jacks, for example, so that the reel can be rotated. After a desired length of cable has been payed out from the reel, the cable is sawed or otherwise cut, generally near the reel. The cut ends tend to be sharp. Many cables have sufficient resiliency that after they have been tightly wound on a reel, they will tend to unwind, with various turns tending to enlarge or move relative to the reel, if their outer end is not fixed to the reel. The outer end of a cable is usually securely fixed to the reel at the factory by means of one or more staples. A cut end remaining on the reel may whip about with substantial force if it is released at the end of a sawing operation, and such movements of sharp cable ends have caused many injuries to workmen.

It is possible, of course, after a length of cable has been cut, to secure the cut end remaining on the reel to the reel with staples. However, that is time-consuming, and it disadvantageously requires that a supply of staples of proper size be carried along on the job. Also, hammering staples over a cable near its end can often break strands of some cables, cut or deform cable insulation, or otherwise damage a cable. Similar damage can result when one pries out staples to free the end of the cable. A primary object of the invention is to provide a clamp to be mounted on or near a cable reel, which clamp can be quickly and easily operated to securely hold a cable end without damage to the cable, and quickly and easily operated to release the cable end when another length of cable is to be removed from the reel. Another object of the invention is to provide a cable clamp which can be re-used many times on different reels. A further object of the invention is to provide a cable clamp which can be used with a wide range of cable diameters. Yet another object of the invention is to provide a cable clamp for mounting on a flange of a cable reel or on nearly structure, which clamp is small, and which does not interfere with the paying out of lengths of cable from the reel.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1 is a front view of a preferred form of cable clamp according to the invention;

FIG..2 is an end view taken at lines 2—2 in FIG. 1;

FIG. 3 is a top view taken at lines 3—3 in FIG. 1 (In each of FIGS. 1-3 a length of cable is shown in phantom at C.);

FIG. 4 is a partial perspective view showing the preferred form of cable clamp assembly mounted on a cable reel and grasping a cable;

Figure 5:
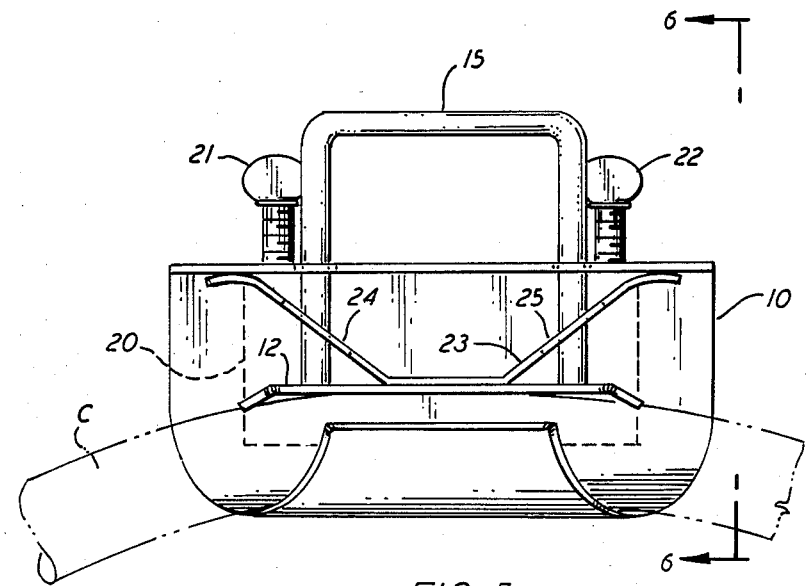
FIG. 5 is a front view of one modified form of cable clamp assembly.

Referring to FIGS. 1-3 a preferred form of cable clamp assembly comprises a generally tubular member 10, which may be formed, for example, by bending a piece of sheet metal, to leave a slot or opening 11 which extends the length of the tubular member. In one satisfactory embodiment of the invention, the tubular member was formed from 14 gauge steel sheet. The cable clamp assembly also includes a clamp member shown as comprising bar 12 and resilient means shown as comprising compression springs 13,14 tending to urge the bar 12 toward the rounded lower wall of the tubular member 10. The cable clamp assembly also includes handle means, shown as comprising a U-shaped rod 15, which is attached to the clamp member 12 and which extends through the upper (in FIG. 1) wall of tubular member 10. U-shaped rod 15 is shown as including a pair of mutually-parallel spaced-apart leg portions 15a,15b, around which resilient means shown as comprising compression springs 13,14 are coiled. Thus the clamp member 12 may be moved against the force of the resilinet means, in a direction opposite to the direction in which the clamp member is urged by the resilient means. A pair of U-shaped pedestal members 18,19 shown welded to tubular member 10 includes upper holes 18a,19a through which legs 15a,15b slidingly pass, with the holes being too small to permit passage of springs 13,14, so that the upper (in FIG. 1) ends of the springs seat against pedestals 18,19 adjacent holes 18a,19a. The legs 15a,15b and springs 13,14 pass through holes 10a,10b in tubular member 10. The lower ends of springs 13,14 seat against bar member 12 adjacent the ends of legs 15a,15b, respectively. The ends of legs 15a,15b are welded to bar 12. Thus springs 13,14 urge bar member 12 downwardly (as viewed in FIG. 1) and when no cable is being clamped, bar member 12 is urged against the lower (in FIG. 1) wall of tubular member 10. By pulling upwardly (in FIG. 1) on rod 15, it will be apparent that one can move bar member 12 upwardly, compressing springs 13 and 14, and if bar member 12 is moved sufficiently upwardly, an end length of a cable C may be pushed via slot 11 into the tubular member 10, below bar member 12, after which release of rod 15 will cause bar member 12 to press the end length of cable against the rounded lower (in FIG. 1) wall of tubular member 10, entrapping the end length of the cable. By simply pulling upwardly on handle member 15, one may release and remove a cable end portion from the clamp assembly. The axes of legs 15a,15b preferably pass through or close to the center of curvature of the rounded lower wall portion of member 10, as shown in FIG. 2. Holes 10a,10b are preferably made slightly oversize, so that handle member 15, springs 13,14 and bar member 12 may rock or rotate (clockwise or counterclockwise as viewed in FIG. 1) a limited amount relative to member 10, tending to insure that both ends of bar 12 will be pressed against a length of cable even if a portion of the length of cable inside the clamp is bent.

The ends of bar member 12 are shown extending beyond the lower rounded portion of tubular member 10, and shown bent slightly downwardly at 12a and 12b, which tends to slightly bend a length of cable engaged by member 12, and to substantially increase the frictional force which will resist any incipient lengthwise movement of the length of cable in a direction generally parallel to bar member 12.

The tubular member 10 is also shown having a plurality of holes 16, 17 extending through a wall of tubular member 10 to allow the tubular member to be nailed or screwed to a flange of a cable reel. The rear wall portion of tubular member 10 in which the mounting holes are provided preferably is made flat, as shown, which facilitates securely attaching the clamp assembly to the inside of a flange of a cable reel, and avoiding loosening of the nails or screws by forces which otherwise might tend to rock or rotate the clamp assembly. Most cable reels have wooden flanges, so that nailing the clamp assembly to the inside of a reel flange is rapidly accomplished. Some cable reels have metal flanges. The clamp assembly may be attached to a metal flange by use of sheet metal screws after two small holes have been drilled or punched in the reel flange. However, an adjacent wall portion 10c (FIG. 2) curves away from the flat portion, making it easy to use a prying tool such as a screwdriver to remove the clamp assembly if it has been nailed to a reel or other object.

In FIG. 4 the clamp assembly is shown mounted on the inside of the flange F of a cable reel and gripping an end length of the cable wound on the reel. In various applications, vehicles such as trucks will usually be used and be available at or near a reel from which cable is being withdrawn, and in other applications other structures will be used adjacent such cable reels. Thus in some applications it will be preferred to permanently mount the clamp assembly on a wall or bed of a truck, or on some other nearby structure, such as a jack used in unreeling cable, so that countless reels of cable may be used without a need to remove and re-install the clamp assembly.

A given size of clamp assembly can accommodate a wide range of cable diameters, and it will be apparent that the assembly shown may be made in a variety of different sizes. It may be noted that when a cable is gripped by the clamp assembly, the compression of springs 13,14, and hence the gripping force advantageously increases for an increase in cable diameter. Thus larger cables are gripped more tightly than smaller cables. Deemed particularly important is the fact that once the clamp assembly is nailed or screwed onto a reel flange or other structure, cable end portions can be inserted into and removed from the clamp assembly very rapidly, by a mere pulling on handle member 15, without a need to use any tool.

Figure 6:
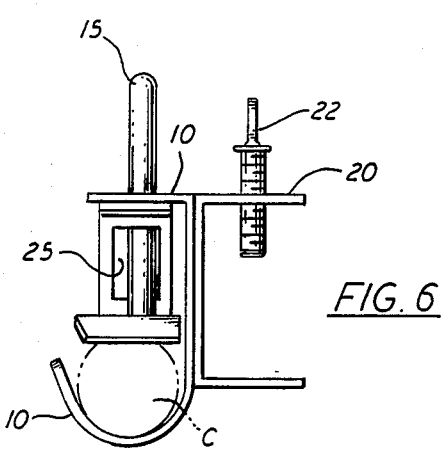
FIG. 6 is an end view of the clamp assembly of FIG. 5.

In a modified form of clamp assembly shown in FIGS. 5 and 6, the resilient means is shown as a leaf spring 23 welded to bar member 12. The legs 15a, 15b of handle member 15 pass through slots 24, 25 in the leaf spring. As the handle member is raised and lowered, the ends of the leaf spring slide along the upper wall of tubular member 10. Rather than a single leaf spring, plural stacked leaves may be provided. Rather than being affixed to bar member 12, the leaf spring could be inverted from the position shown and affixed to the upper wall of tubular member 10, so that the ends of the leaf spring slide along the top of bar member 12 as the bar member is raised and lowered. Plural stacked leaves also could be used in the inverted manner.

The device of FIGS. 5 and 6 is shown including a channel member 20 welded to the rear side of tubular member 10. A pair of thumbscrews 21, 22 are threaded through the upper flange of the channel member. With such an arrangement the assembly may be readily mounted, if desired, on the edge of a flange (F, FIG. 4) of a cable reel. A leaf spring (or springs) may be substituted for the coil springs in the device of FIGS. 1-3 without using the channel mounting member, and conversely, the channel mounting arrangement can be added to the assembly of FIGS. 1-3 without using leaf springs.

It is important to note that the clamp assembly is quite inexpensive to fabricate, since it may use common stock materials, and requires only simple metal-forming, drilling and welding operations. In some embodiments of the invention, various parts of the assembly could be made of plastic. It is not strictly necessary that the ends of bar member 12 be bent. The underside of bar member 12 instead may be roughened in one of a variety of different ways, so as to increase the friction with which it grips a cable.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. A cable clamp assembly for releasably clamping a cable end to the inside of a flange of a cable reel, comprising, in combination: a tubular member having a slot extending the length of said tubular member; a clamp member situated within said tubular member; resilient means extending within said tubular member and tending to urge said clamp member toward a first wall portion of said tubular member; and handle means attached to said clamp member and extending through a second wall portion of said tubular member to allow said clamp member to be pulled in a direction opposite to the direction in which said clamp member is urged by said resilient means.

2. The assembly of claim 1 having a plurality of holes extending through a wall portion of said tubular member to allow said tubular member to be nailed or screwed to a flange of a cable reel.

3. The assembly of claim 1 wherein end portions of said slot have a greater width than an intermediate portion of said slot.

4. The assembly of claim 1 wherein said handle means comprises a U-shaped rod, the legs of which extend into said tubular member, said resilient means comprising a pair of compression springs carried on said legs of said U-shaped rod.

5. The assembly of claim 1 wherein said first wall portion of said tubular member is generally arcuate in cross-section.

6. The assembly of claim 1 wherein the ends of said clamp member are bent and extend beyond respective ends of said first wall portion of said tubular member, whereby said clamp assembly tends to bend a length of cable extending through said tubular member.

7. The assembly of claim 1 wherein said resilient means extend outside said tubular member.

8. The assembly of claim 1 wherein said resilient means comprises a leaf spring.

9. The assembly of claim 2 wherein said wall portion through which said holes extend is flat.

10. The assembly of claim 4 wherein said first wall portion of said tubular member is generally arcuate in cross-section and the axes of said legs of said handle means extend substantially through the center of curvature of said first wall portion.

11. The assembly of claim 4 having a pair of pedestal members mounted on said second wall portion, each of said pedestal members having a bore fixedly spaced from said second wall portion, said legs of said handle means extending through respective ones of said bores in said pedestal members.

* * * * *